US00RE49010E

(19) United States
(12) Reissued Patent
Kim et al.

(10) Patent Number: US RE49,010 E
(45) Date of Reissued Patent: Apr. 5, 2022

(54) AUTO-FOCUSING APPARATUS HAVING ASYMMETRIC SUPPORTING STRUCTURE

(71) Applicant: JAHWA electronics Co., Ltd., Chungcheongbuk-do (KR)

(72) Inventors: Hee Seung Kim, Seoul (KR); In Soo Kim, Gyeonggi-do (KR)

(73) Assignee: JAHWA electronics Co., Ltd., Chungcheongbuk-Do (KR)

(21) Appl. No.: 16/918,182

(22) Filed: Jul. 1, 2020

Related U.S. Patent Documents

Reissue of:
(64) Patent No.: 10,156,773
Issued: Dec. 18, 2018
Appl. No.: 15/832,364
Filed: Dec. 5, 2017

(30) Foreign Application Priority Data

Dec. 20, 2016 (KR) ..... 10-2016-0174693

(51) Int. Cl.
*G03B 13/36* (2021.01)
*G02B 7/09* (2021.01)
*H04N 5/225* (2006.01)
*H04N 5/232* (2006.01)
*G02B 7/08* (2021.01)

(52) U.S. Cl.
CPC ..... *G03B 13/36* (2013.01); *G02B 7/08* (2013.01); *G02B 7/09* (2013.01); *H04N 5/2253* (2013.01); *H04N 5/2254* (2013.01); *H04N 5/23212* (2013.01); *H04N 5/23287* (2013.01); *G03B 2205/0069* (2013.01)

(58) Field of Classification Search
CPC .. G03B 13/36; G03B 2205/0069; G03B 3/10; H04N 5/2253; H04N 5/2254; H04N 5/23212; H04N 5/23287; G02B 7/08; G02B 7/09
See application file for complete search history.

(56) References Cited

U.S. PATENT DOCUMENTS

2017/0108660 A1* 4/2017 Kuo ..... G02B 27/646
2017/0261720 A1* 9/2017 Kang ..... G02B 7/023
2018/0113374 A1* 4/2018 Du ..... G02B 27/646
2018/0146124 A1* 5/2018 Choi ..... H04N 5/2252

* cited by examiner

*Primary Examiner* — Peng Ke
(74) *Attorney, Agent, or Firm* — The PL Law Group, PLLC

(57) ABSTRACT

Disclosed is an auto-focusing apparatus having an asymmetric supporting structure, which includes a first frame having a magnet; a second frame having an AF coil for moving the first frame in an optical axis direction; a first ball group located between the first frame and the second frame and having a number of balls arranged along the optical axis direction; and a second ball group located between the first frame and the second frame at a position different from the first ball group and having a number of balls arranged along the optical axis direction. The first ball group include two first support balls having a greater size than the other balls in the first ball group, and the second ball group includes two second support balls having a greater size than the other balls in the second ball group.

6 Claims, 6 Drawing Sheets

AUTO-FOCUSING APPARATUS HAVING ASYMMETRIC SUPPORTING STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

The present disclosure relates to an auto-focusing apparatus for a camera module, and more particularly, to an auto-focusing apparatus having an asymmetric supporting structure, which includes an improved supporting structure for balls which guide the movement of a carrier or the like, on which a lens is loaded, in an optical axis direction.

BACKGROUND

As hardware technology for image processing has been developed and user needs for image shooting have increased, various functions such as auto-focusing (AF) and optical image stabilization (OIS) have been applied to a camera module mounted to a mobile terminal such as a mobile phone and a smart phone as well as an independent camera device.

The auto-focusing function adjusts a focal distance to a subject by linearly moving a lens or an assembly having the lens in an optical axis direction so that a clear image is generated on an image sensor (CMOS, CCD or the like) at a rear end of the lens.

The auto-focusing function may be performed in various ways. Representatively, a magnet (a permanent magnet) is installed at an AF carrier (or, a mover), a coil is installed at a stator (a housing, or another-type carrier), and an electromagnetic force is generated between the coil (provided at the stator) and the magnet (provided at the mover) by a power applied with an appropriate magnitude and direction, thereby moving the mover in an optical axis direction.

In addition, in recent years, a device or an actuator in which the AF function and the OIS functions are integrated has been used. In this case, a structure for moving the OIS carrier (or, a frame, a lens assembly or the like) at which the lens is loaded in a direction perpendicular to the optical axis direction at the inside of the AF carrier is integrally implemented with the AF structure described above. In some embodiments, it is also possible that a lens is mounted at the AF carrier and an OIS carrier provided out of the AF carrier moves in a direction perpendicular to the optical axis direction.

Meanwhile, a conventional device having only an AF function alone or having the AF function and the OIS function together includes a magnet 520 for receiving a driving force by an electromagnetic force of an AF coil, as shown in FIG. 1, and balls 510, 510-1, 510-2 arranged in the same direction as the optical axis are interposed between the AF carrier (or, the mover) 500 and the housing (or, the stator) (not shown) to improve the behavior characteristics of the AF carrier 500 moving in the optical axis direction.

In this structure, a suitable distance may be maintained between the mover and the stator, and the AF carrier may be more flexibly and accurately moved in the optical axis direction by minimizing a frictional force by means of ball rolling, movement, and point contact with the ball.

In the existing technique, it is common to use a plurality of balls b1 to b6 having the same size (or, diameter) d1 to d6.

In this case, all the balls theoretically make the point contact at the same time, and thus it may be regarded that the horizontal direction of the AF carrier is maintained even though the AF carrier (or, the mover) 500 moves in the optical axis direction. However, this is different from the actual situation, and a defect may occur in the horizontal tilt of the AF carrier.

A representative reason for this is that all the balls cannot have a perfectly identical size and thus ideal sameness cannot be achieved, and thus the AF carrier 500 is not possible to make the point contact at the same time.

In addition, since the AF carrier 500 is not fixed at a specific position but repeatedly moves and stops in the optical axis direction, a static frictional force and a kinetic frictional force are generated with different intensities, and a clearance is generated due to the different frictional forces. For this reason, all the balls are not able to make the point contact at the same time, and thus a tilt defect occurs at the AF carrier.

Further, even though one side of the AF carrier is closely adhered to the ball due to an attracting force generated between the magnet of the AF carrier and the yoke provided at the stator, since the AF carrier has a shape extending in the horizontal direction, more gravity is influenced on a portion of the AF carrier farther from one side closely adhered to the ball, namely on a portion more extended. For this reason, all the balls are not able to make point contact at the same time. Since the above factors are applied in combination, a tilt defect occurs at the AF carrier.

Since a plurality of balls are simply disposed without consideration of the above problem in the existing technique, in the conventional device, when the AF carrier 500 moves in the optical axis direction, balls making point contact with the AF carrier 500 are frequently changed, which collapses the balance of the AF carrier 500. As a result, tilt defects θ1 and θ2 as shown in FIG. 2 occurs at the AF carrier 500.

The tilt defects deform an optical path, along which light is introduced to an image sensor 600 through the lens, as much as a maximum separation angle (θ=θ1+θ2). Thus, an error occurs in the focus adjustment as much, thereby causing a problem in generating a clear image.

In recent years, a camera module mounted at a smart phone or the like is realized with a light and slim design. If the camera module has a slim design as above, a ratio of width to thickness of the AF carrier is increased, and thus the tilt problem of the AF carrier as described above becomes more serious.

In addition, in the conventional device having the AF function, as shown in FIG. 1, three balls arranged in the optical axis direction are respectively provided at right and left sides. Here, if it is intended to miniaturize the camera module or the device having the AF function, the camera module should accommodate the volume of the balls, and thus there is a great need for a structure where the AF carrier is supported by a larger number of balls with a smaller diameter.

SUMMARY

The present disclosure is designed to solve the problems of the related art, and therefore the present disclosure is directed to providing an auto-focusing apparatus, in which a mover and a stator for AF operation are physically supported by balls so that balls directly supporting the mover and the stator have asymmetric or differential right and left intervals therebetween, which is closest to a structure supported by three balls, thereby minimizing a clearance or separation phenomenon depending on the change of balls making point contact.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an auto-focusing apparatus having an asymmetric supporting structure, comprising: a first frame having a magnet; a second frame having an AF coil for moving the first frame in an optical axis direction; a first ball group located between the first frame and the second frame and having a n (n is a natural number of 4 or above) number of balls arranged along the optical axis direction; and a second ball group located between the first frame and the second frame at a position different from the first ball group and having a m (m is a natural number of 4 or above) number of balls arranged along the optical axis direction, wherein the first ball group include two first support balls having a greater size than the other balls in the first ball group, and the second ball group includes two second support balls having a greater size than the other balls in the second ball group.

Here, the first support balls of the present disclosure may be located at both ends of the first ball group, and the second support balls may be located at a center of the second ball group and adjacent to each other. Further, the first support balls and the second support balls may have the same size.

More preferably, in the present disclosure, the first ball group and second ball group respectively have four balls, and in this case, the first support balls may be located at first and fourth positions in the first ball group based on the optical axis direction, and the second support balls may be located at second and third positions in the second ball group based on the optical axis direction.

In addition, the first frame of the present disclosure may have first and second guiding grooves extending along the optical axis direction, the second frame may have first and second accommodating grooves respectively facing the first and second guiding grooves, and in this case, the first ball group may be located between the first guiding groove and the first accommodating groove, and the second ball group may be located between the second guiding groove and the second accommodating groove.

Preferably at least one of the first guiding groove and the first accommodating groove may have a V-shaped cross section.

According to an embodiment of the present disclosure, a frame (an AF carrier) for AF operation is configured to be supported by four balls having a larger diameter than the other balls, wherein the pitch between the supporting balls is asymmetric or differentiated so as to be closest to a three-ball supporting structure, thereby minimizing a tilt defect at the AF carrier (the frame).

Further, according to the embodiment of the present disclosure, the left and right sides of the AF frame are supported by four or more balls having a small diameter, which is optimized to make a light and small design of the apparatus.

BRIEF DESCRIPTION

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

An auto-focusing apparatus 100 according to the present disclosure linearly moves an AF carrier, on which a lens may be loaded, forward or backward in an optical axis direction (Z-axis direction) by an electromagnetic force generated between a coil and a magnet, so that a focal distance to a subject is exactly matched to generate a clearer image with respect to the subject. In some embodiments, the present disclosure may be applied not only to a device having only the AF function but also to a device having the AF function and the OIS function integrally.

Figure 1:
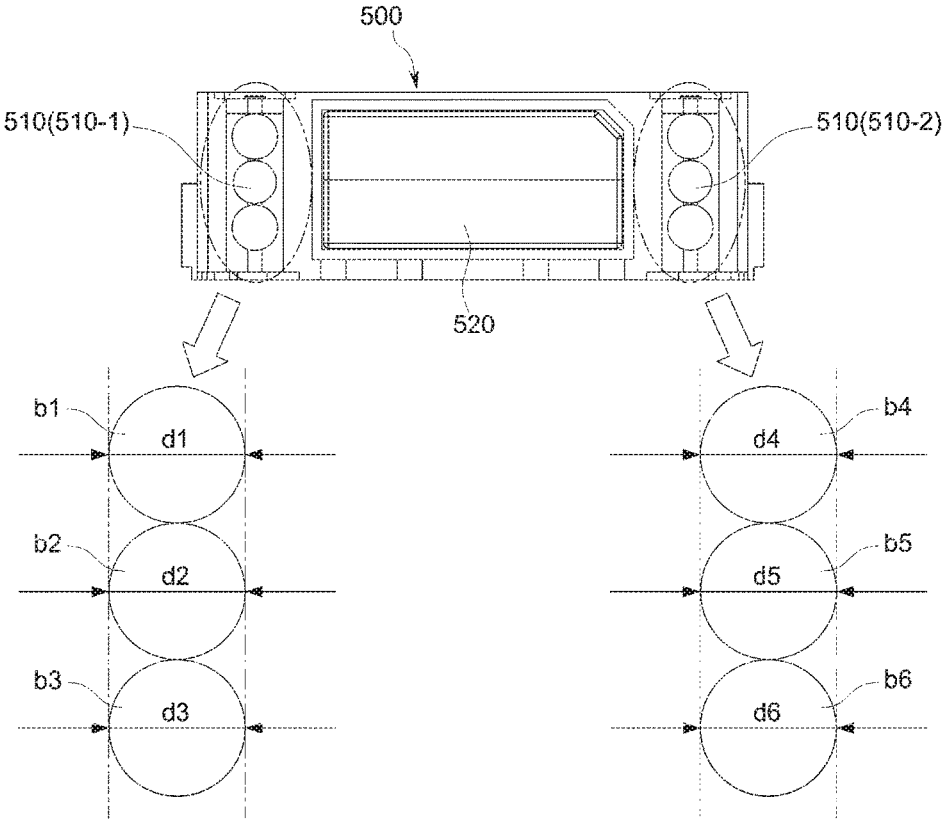
FIG. 1 is a diagram showing a structure of conventional AF operation.
Figure 2:
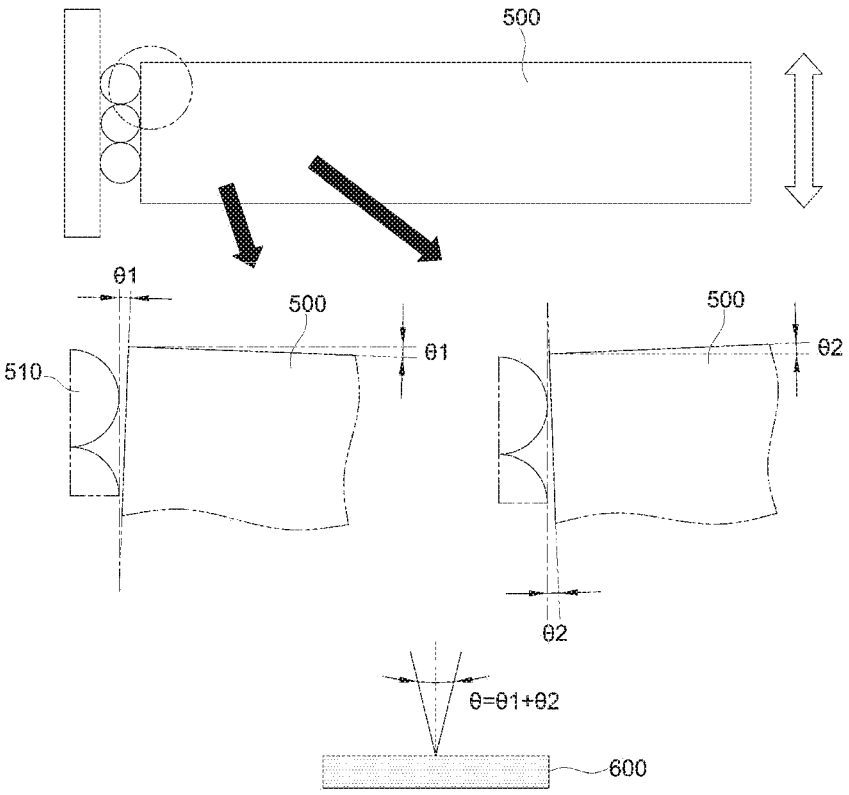
FIG. 2 is a diagram for illustrating a tilt defect occurring at conventional AF operation.
Figure 3:
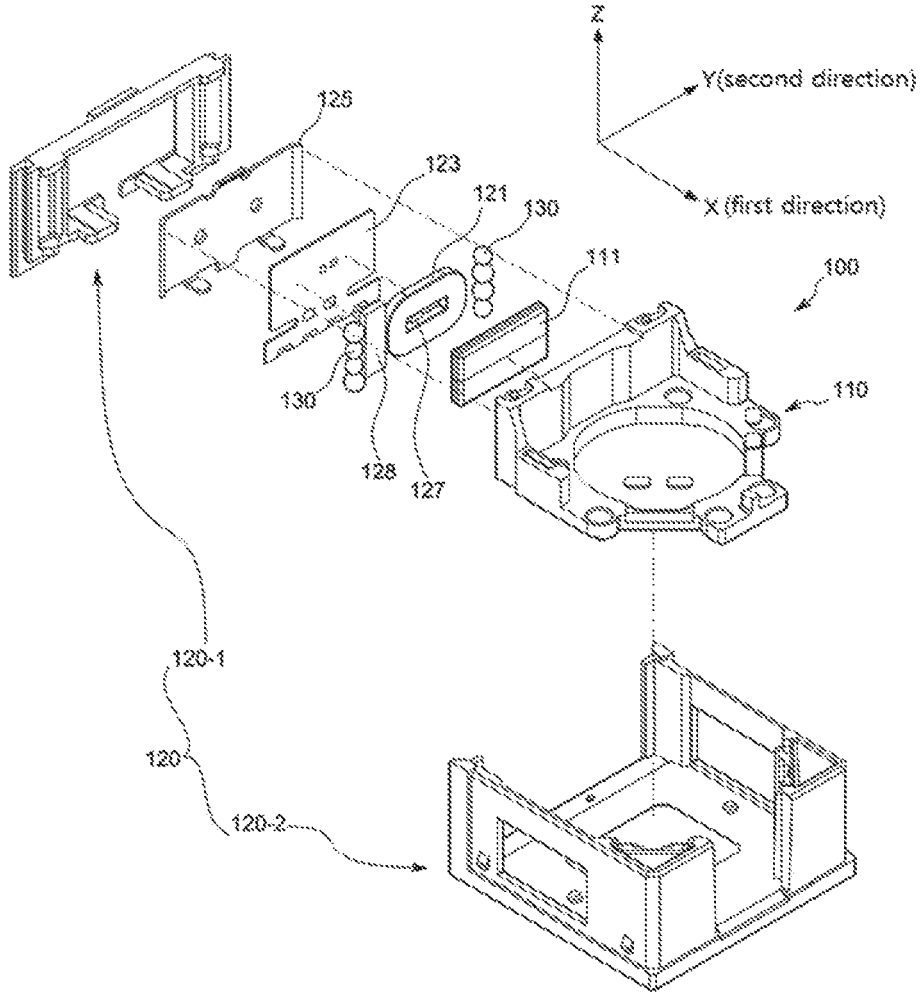
FIG. 3 is an exploded view showing an auto-focusing apparatus according to an embodiment of the present disclosure.

FIG. 3 is an exploded view showing an auto-focusing apparatus 100 having an asymmetric supporting structure according to an embodiment of the present disclosure.

As shown in FIG. 3, the auto-focusing apparatus 100 according to an embodiment of the present disclosure may include a first frame 110, a second frame 120, and a plurality of balls 130.

The first frame 110 includes a magnet 111, and a back yoke (not shown) for concentrating a magnetic force may be further installed at a rear surface of the magnet 111. The first frame 110 is a mover for the AF operation and corresponds to an AF carrier or an AF frame described above.

In a device having only the AF function, a lens (not shown) is loaded at the first frame 110 to physically move together with the first frame 110. Thus, as the first frame 110 moves in the optical axis direction, the lens also moves in the optical axis direction (Z-axis direction), thereby adjusting a distance to an image sensor to implement an auto-focusing function.

In a device having the AF function and the OIS function integrally, an OIS frame (or, a carrier) moving in X-axis and Y-axis directions (perpendicular to the optical axis direction (Z)) may be provided at the first frame 110.

A lens (or, a lens assembly) may be mounted at the OIS frame (not shown). In this case, if the first frame 110 moves in the optical axis direction, the OIS frame is also moved in the optical axis direction, and accordingly the lens also moves in the optical axis direction. If the OIS operation for optical image stabilization is performed, the OIS frame may be configured to move in a direction perpendicular to the optical axis direction at the top of the first frame in order to compensate for the movement caused by hand trembling.

The second frame 120 of the present disclosure is provided to correspond to the first frame 110. If the first frame 110 is a mover for AF operation, the second frame 120 corresponds to a stator.

The second frame 120 may include an AF coil 121, a FPCB 123, a drive chip 125, and a hole sensor 127. The AF coil 121 generates an electromagnetic force corresponding to the magnitude and direction of the power source applied from the outside to move the first frame 110 having the magnet 111 in the optical axis direction.

The hole sensor 127 senses a position of the magnet 111 (a position of the first frame, namely a position of the lens) using the hall effect and transmits a corresponding signal to the drive chip 125 of the present disclosure. The drive chip 125 uses the input signal of the hole sensor so that a power of a proper magnitude and direction is applied to the AF coil 121.

In this way, the auto-focusing function is realized by feeding back an accurate position of the lens based on the optical axis direction. The AF coil 121, the drive chip 125 and the hole sensor 127 may be mounted on the FPCB 123 which is connected to an external module, a power source, a device and the like.

As shown in FIG. 3, the second frame 120 may be separately configured with a second sub frame 120-1 and a second main frame 120-2, or may be implemented as a single unified object.

As shown in FIG. 3, a plurality of balls 130 are located between the first frame 110 and the second frame 120 (the second sub frame 120-1), and the first frame 110 and the second frame 120 keep spaced apart from each other by a distance corresponding to the diameter of the balls 130.

The interval between the first frame 110 and the second frame 120 is maintained by means of the balls 130. Also, a yoke (not shown) for generating an attracting force to the magnet 111 provided at the first frame 110 may be further provided at the second frame 120 so that the first frame 110 may keep point contact with the balls 130.

Even though the plurality of balls 130 are designed to make point contact with both the first frame 110 and the second frame 120 as described above, it is impossible to make point contact at 4 or more positions at the same time, unless it is an ideal case. Thus, if the first frame 110 moves linearly, balls making point contact with the first frame 110 are changed frequently, thereby causing a tilt defect at the first frame 110.

The present disclosure recognizes the problem, and in order to solve the problem and also to optimize a small and slim design of the apparatus, first, the first frame 110 and the second frame 110 and 120 are configured to be supported by right and left ball groups, each of which is composed of four or more balls.

In addition, in the present disclosure, unlike the conventional technique, the balls belonging to each ball group are not made up of balls of the same size. In other words, two balls (hereinafter, referred to as "large-diameter balls") having a larger size than the other balls belonging to the same group are included in each group, and the first frame 110 and the second frame 120 are configured to be supported by the large-diameter balls.

If the four large-diameter balls are configured too much larger than the other balls (hereinafter, referred to as "small-diameter balls"), they may interfere with the rotational movement of the balls due to the contact among the balls. Thus, the size relationship between the large-diameter balls and the small-diameter balls may be selected in various ways depending on the embodiment not to disturb the rotational movement of the balls.

In this regard, the large-diameter ball may have a size of about 105% to 120% as compared with the small-diameter balls. Meanwhile, an absolute size of the ball may be variously selected in consideration of the device size and the like.

If the shape, form, step or the like of the first frame 110 or the second frame 120 making point contact with the large-diameter balls is adjusted to correspond to the size or position of each large-diameter ball, the first frame 110 may be implemented with horizontality. For this reason, the large-diameter balls need not have the same size. However, in order to implement the product more simply and precisely, the large-diameter balls may be designed with the same size.

Figure 4:
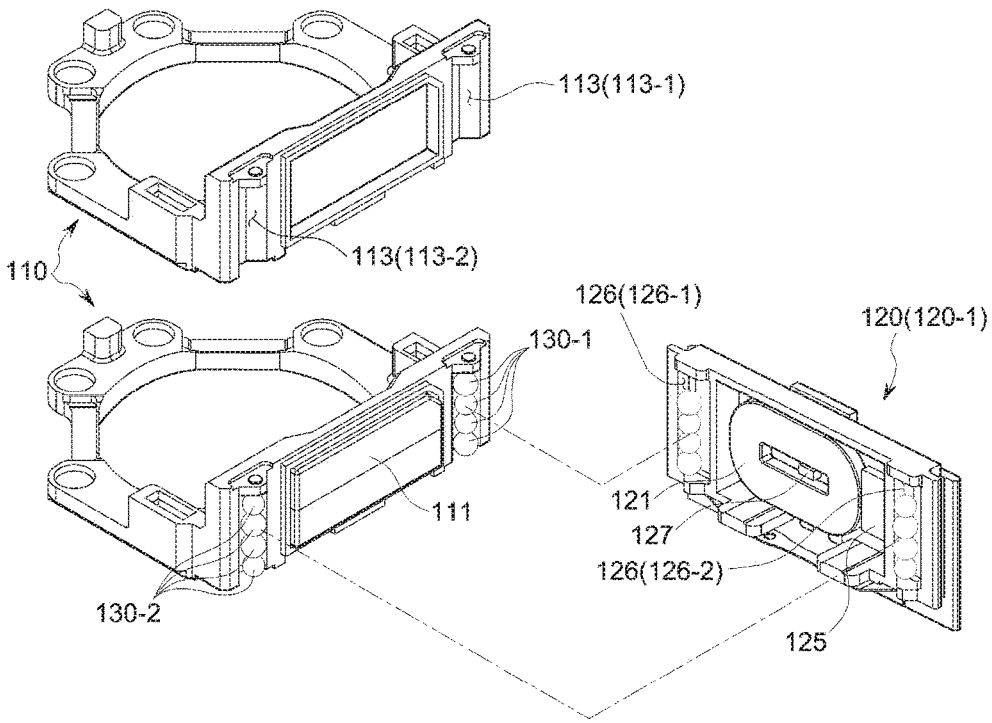
FIG. 4 is a detailed diagram showing the first frame and the second frame of the present disclosure depicted in FIG. 3.

FIG. 4 is a detailed diagram showing the first frame 110 and the second frame 120 of the present disclosure.

As described above, the first frame 110 of the present disclosure moves forward and backward along the optical axis direction. Thus, in order to effectively guide the movement along the optical axis direction, as shown in FIGS. 3 and 4, the plurality of balls 130 of the present disclosure may be arranged along the optical axis direction (Z-axis direction).

Further, in order to physically support the first frame 110 more stably by the point contact, the plurality of balls 130 may include a first ball group 130-1 having a n number of balls arranged along the optical axis direction and a second ball group 130-2 provided at a position different from the first ball group 130-1 and having a m number of balls arranged along the optical axis direction.

n and m are natural numbers of 4 or above, and n and m may be the same number or different numbers.

In this case, two balls belonging to the first ball group 130-1 are configured to have a greater size than the other balls belonging to the first ball group 130-1, and two balls belonging to the second ball group 130-2 are configured to have a greater size than the other balls belonging to the second ball group 130-2, so that the first frame 110 or the second frame 120 is supported by these large-diameter balls.

Since the frame is supported by the large-diameter ball, the large-diameter ball will be called a support ball in the following description. Specifically, in the first ball group 130-1, two balls having a larger size than the other the balls belonging to the first ball group are called first support balls, and in the second ball group 130-2, two balls having a larger size than the other balls belonging to the second ball group are referred to as second support balls.

For the more preferred embodiment, the first support balls may be located at both ends of the first ball group 130-1, and the second support balls may be located at a center of the second ball group 130-2 to be adjacent to each other.

However, even though two ball groups are depicted in the figures of the present disclosure, additional ball groups may be further included in addition to the first ball group 130-1 and the second ball group 130-2 in order to more effectively support the linear movement of the first frame 110 (the AF carrier).

A guiding groove 113 having a shape extending along the optical axis direction may be provided at the first frame 110 in order to prevent the plurality of balls 130 from deviating to the outside and guide the movement of the first frame 110 in the optical axis direction more effectively. Also, as shown in FIG. 4, the guiding groove 113 may be composed of a first guiding groove 113-1 located at a right side and a second guiding groove 113-2 located at a left side, based on FIG. 4.

An accommodating groove 126 may be formed at the second frame 120 to correspond to the guiding groove 113. The accommodating groove 126 may be composed of a first accommodating groove 126-1 corresponding to the first guiding groove 113-1 of the first frame 110 and a second accommodating groove 126-2 corresponding to the second guiding groove 113-2 of the first frame 110, namely disposed at a position facing the second guiding groove 113-2.

In this case, the first ball group 130-1 described above may be provided to be partially accommodated between the first guiding groove 113-1 and the first accommodating groove 126-1, and the second ball group 130-2 may be provided to be partially accommodated between the second guiding groove 113-2 and the second accommodating groove 126-2.

Any one guiding groove 113 of the first guiding groove 113-1 and the second guiding groove 113-2 may have a "V"-shaped cross section, and the other guiding groove may have a "U"-shaped cross section. This may also be identically applied to the first accommodating groove 126-1 and the second accommodating groove 126-2.

If both the guiding grooves 113 or both the accommodating grooves 126 have different shapes, it is possible to have different contact portions and different rotation characteristics, and thus the operation characteristics of the first frame 110 moving in the optical axis direction may be further improved.

If the guiding groove 113 or the accommodating groove 126 have a V-shaped cross section, the ball 130 make point contact with the guiding groove 113 or the accommodating groove 126 at two points without any clearance.

In order that ball 130 supports the first frame 110 more effectively and the first frame 110 is guided to linearly move in the optical axis direction more effectively by using the above feature, at least one of the first guiding groove 113-1 and the first accommodating groove 126-1 for guiding the first ball group 130-1 having two first support balls located at both ends thereof may have a "V"-shaped cross section.

In an embodiment, both the first guiding grooves 113-1 and the second guiding grooves 113-2 provided at the first frame 110 may have a "V"-shaped cross section, and the first accommodating grooves 126-1 provided at the second frame may have a "V"-shaped cross section, and the second accommodating groove 126-2 may have a "U"-shaped or "trapezoidal" cross section.

Figure 5:
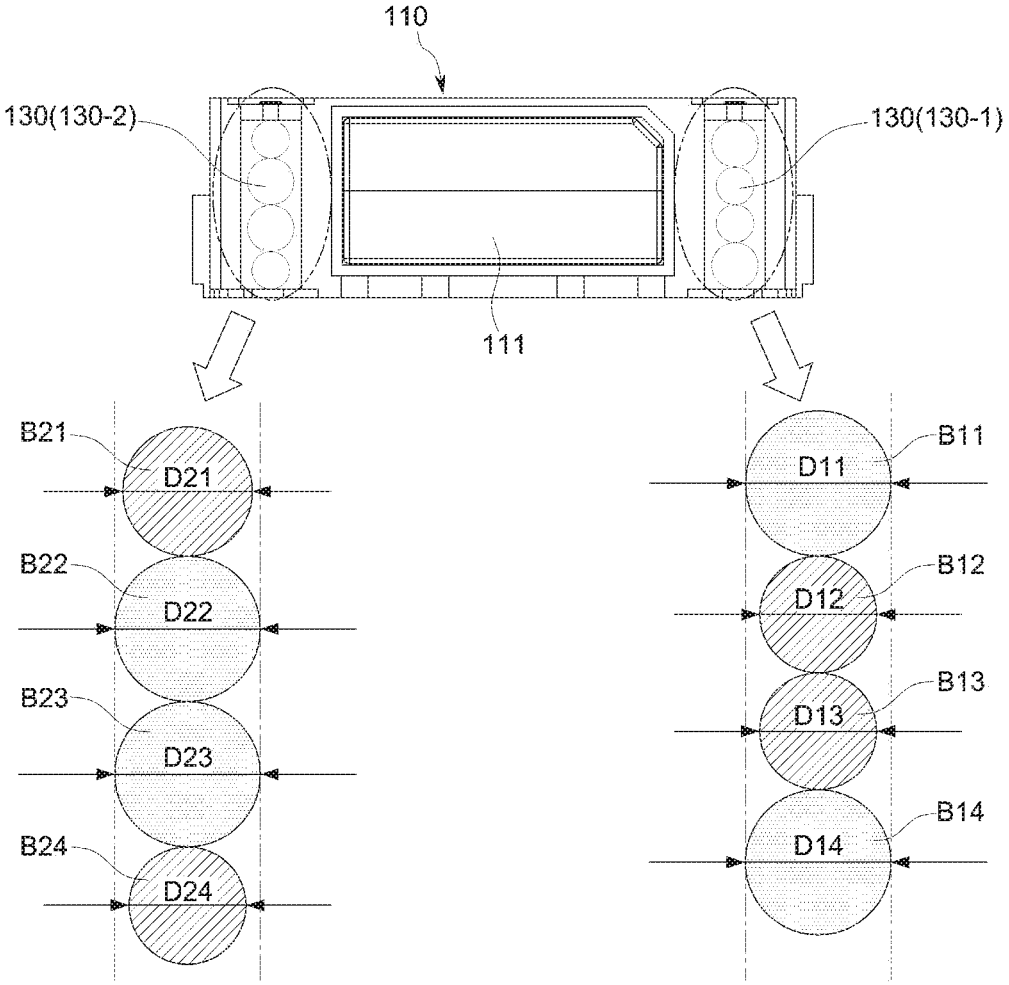
FIG. 5 is a diagram showing balls according to an embodiment of the present disclosure.

FIG. 5 is a diagram showing the balls 130 provided at the first frame 110 according to an embodiment of the present disclosure.

Referring to FIG. 5, the first support balls are B11 and B14 among the balls belonging to the first ball group 130-1, and the second support balls are B22 and B23 among the balls belonging to the second ball group 130-2. The first support balls and the second support balls may be configured to have the same diameter and size (D11=D14=D22=D23).

As shown in the figure, the diameter of the balls B12 and B13 located between the first support balls B11, B14 are smaller than the diameter of the first support balls (D12 D13<D11=D14), and ball B12 and the ball B13 may have different sizes depending on the embodiment. In addition, the first support balls B11, B14 may have the same size, but they may not be physically identical due to a clearance or error. In this case, the first support balls B11, B14 are still configured to have a greater diameter than the other balls B12, B13.

The balls B21, B24 located at the center of the second ball group 130-2 and located outer than the second support balls B22, B23 adjacent to each other may have a smaller diameter than the second support balls (D21=D24<D22=D23). Also, the ball B21 and the ball B24 may different sizes D21, D24, but preferably, they may have the same size.

The second support balls B22, B23 may also be implemented to have the same size, but they may partially have different sizes due to tolerances or the like, and in this case, the second support balls B22, B23 may also have a larger diameter than the other balls B21, B24.

As shown in FIG. 5, two first support balls B11, B14 belonging to the first ball group 130-1, which have a larger size than the other balls belonging to the same group, may be located at both ends of the first ball group 130-1.

In addition, two second support balls B22, B23 belonging to the second ball group 130-2, which have a larger size than the other balls belonging to the same group, may be located at a center of the second ball group 130-2 to be adjacent to each other. For example, if the second ball group 130-2 has four balls, the second support balls B22, B23 are located at second and third positions based on the optical axis direction.

In this configuration, it is possible to induce the frames to be physically supported in a wider area with a balance, and also to minimize the separation or clearance that may occur while the first frame 110 is moving in the optical axis direction.

If five balls belong to the first ball group 130-1, two first support balls may be located at any positions among five balls but may be provided at mutually symmetrical positions with respect to the ball at the center, preferably at both ends among the five balls, to effectively realize parallel supporting.

Also, if the second ball group 130-2 has five balls, the second support balls may be located at second and third positions or third and fourth positions to increase the efficiency of the parallel supporting and to minimize the separation or clearance caused by the supporting balls.

Figure 6:
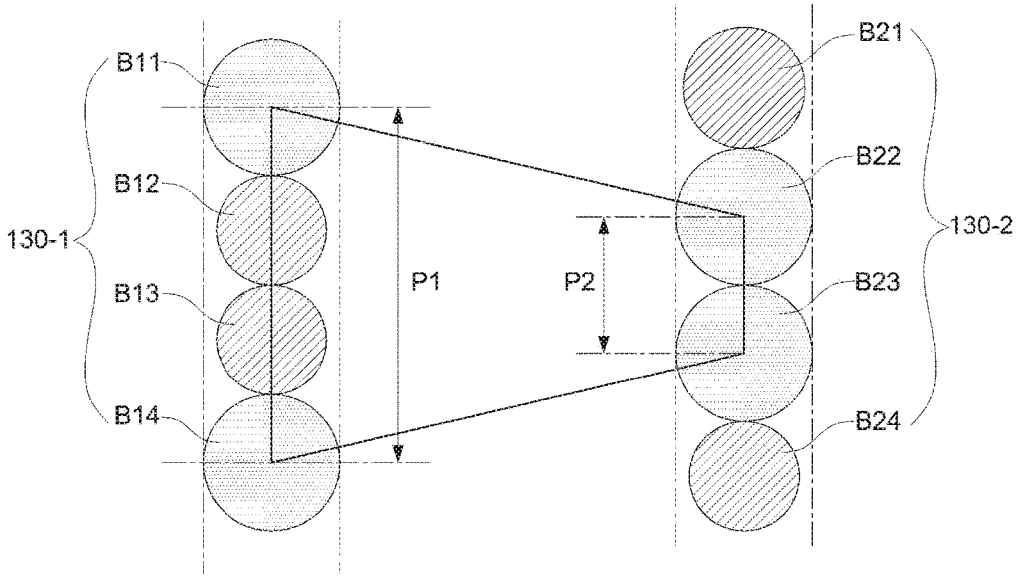
FIG. 6 is a diagram for illustrating a structure of the present disclosure where a tilt defect is reduced when the AF frame moves along the optical axis.

FIG. 6 is a diagram for illustrating a structure of the present disclosure for reducing a tilt defect when the AF frame (the first frame) 110 moves along an optical axis.

Among the ball groups depicted in FIG. 6, the ball group at a left side corresponds to the first ball group 130-1, and the ball group at a right side corresponds to the second ball group 130-2. The left and right positions of the first ball group 130-1 and the second ball group 130-2 may be changed at any time depending on an embodiment.

As shown in FIG. 6, the first support balls B11, B14 of the first ball group 130-1 are located at both ends in the first ball group, and the second support balls B22, B23 of the second ball group 130-2 are located at the center in the second ball group.

As described above, even though the first frame 110 or the second frame 120 is designed to be supported by four balls, four balls may not be perfectly identical. Also, since the first frame 110 moves linearly in the optical axis direction, the first frame 110 is not able to always make point contact with four balls.

Thus, when the first frame 110 moves linearly, balls making point contact with the first frame 110 are frequently changed due to physical movement, external shaking or the like, and thus a fine tilt defect occurs due to the change.

The present disclosure is directed to minimizing such fine tilt defect, and the first frame 110 is supported by four support balls (the first support balls and the second support balls) so that the first support balls are located at both ends of the first ball group 130-1 and the second support balls are located at the center of the second ball group 130-2 as shown in the figures.

In this configuration, a pitch P1 between the first support balls B11, B14 is maximized and a pitch P2 between the second support balls B22, B23 is minimized.

In other words, since the pitch P1 between the first support balls is maximally extended and the pitch P2 between the second support balls is minimally reduced to be relatively smaller than P1, the first frame 110 may be induced to always make contact with the first support balls B11, B14 among four support balls (two first support balls and two support balls).

Thus, even though balls making point contact with the first frame 110 are changed among four support balls while the first frame 110 is moving linearly, at least the first support balls B11, B14 always keep the contact with the first frame 110, and it may be induced to change the contact points at the second support balls B22, B23 where the pitch P2 is minimized.

In addition, the second support balls B22, B23 are designed to have the same size as described above, and the pitch P2 thereof is minimized. Thus, even though the contact point is changed, a horizontal tilt caused by the change of the contact point may be minimized.

If four large-diameter balls are located at both ends of every ball group, the distance or pitch between the large-diameter balls in the corresponding group becomes equal to each other. Thus, when the first frame 110 moves linearly, none of the balls always make point contact with the first frame 110. As a result, when the first frame 110 moves linearly, balls making the point contact are changed frequently, thereby increasing a tilt defect.

In the corresponding point of view, if the second support balls are not adjacent to each other, the pitch P2 between the second support balls is increased to be closer to the pitch P1 between the first support balls, and thus the possibility that the first support balls always make contact with the first frame 110 is lowered. Thus, it is desirable that the second support balls are adjacent to each other so that the pitch P2 of the second support balls is minimized.

As shown in FIG. 6, the structure of supporting the first frame 110 has a trapezoidal shape, and if the pitch P2 between the second support balls B22, B23 is ideally minimized, the structure of supporting the first frame 110 may be closer to a triangular shape, namely a three-ball supporting structure.

If the first frame 110 is supported by three balls, their physical point contact may be constant, and thus the tilt phenomenon caused by the linear movement of the first frame 110 may be minimized. If the pitches of the first support balls and the second support balls are asymmetric as described above, the supporting structure may be closer to a three-ball supporting structure, thereby minimizing a tilt defect at the first frame 110.

Figure 7:
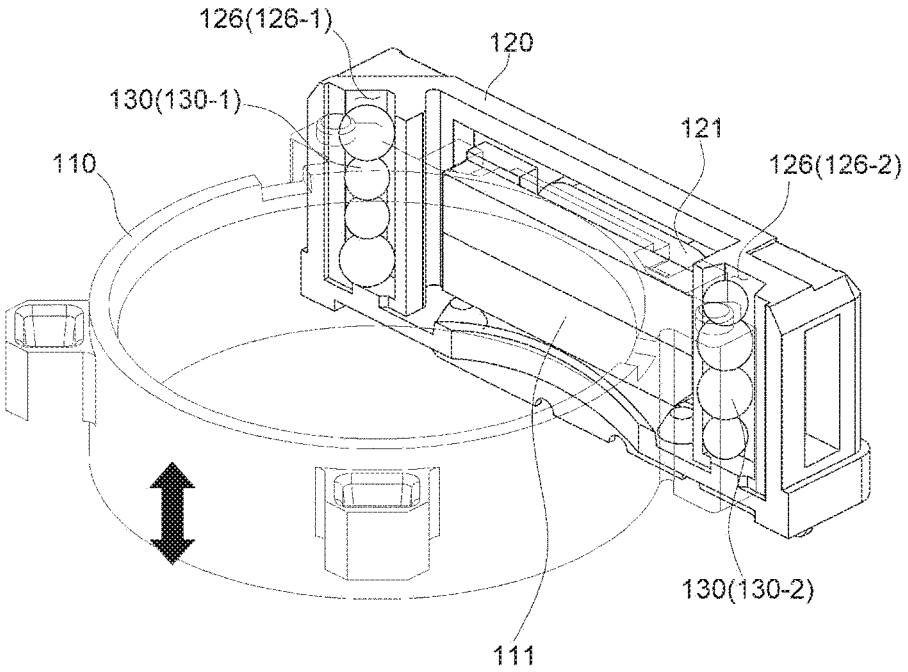
FIG. 7 is a diagram for illustrating a coupling relationship of the first frame, the second frame and the like according to another embodiment of the present disclosure.

FIG. 7 is a diagram showing a coupling relationship of the first frame 110, the second frame 120 and the like according to another embodiment of the present disclosure. Even though FIGS. 4 and 5 show that the balls 130 are provided at the first frame 110, FIG. 7 shows that the balls 130 are provided at the second frame 120. In FIG. 7, the first frame 110 is depicted transparently so that the structure of the second frame 120 may be clearly shown.

As shown in FIG. 7, the shape or structure of the first frame 110 or the second frame 120 is different from the shape or structure shown in other figures. If the present disclosure may be implemented in this way, the first frame 110 or the second frame 120 may be implemented with various shapes and structures.

As described above, if power of appropriate magnitude and direction is applied to the AF coil 121, the AF coil 121 generates an electromagnetic force at the magnet 111, and the first frame 110 having the magnet 111 moves linearly in the optical axis direction by means of the electromagnetic force.

At this time, the first frame 110 linearly moves in the optical axis direction while being supported by two first support balls belonging to the first ball group 130-1 and two second support balls belonging to the second ball group 130-2.

Two first support balls located at both ends of the first ball group 130-1 support the first frame 110 with a maximum pitch P1 and are always in contact with the first frame 110, thereby guiding the first frame 110 to move in the optical axis direction more accurately. The second support balls are located in the center of the second ball group 130-2, and thus, even though second support balls making contact with the first frame 110 are changed, it is possible to minimize movement caused by the change.

In the above present disclosure, the modifiers such as "first" and "second" are merely terms having instrumental concepts used to relatively identify components from each other and thus should not be interpreted as denoting specific orders, priorities or the like.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

The accompanying drawings for illustrating the present disclosure and the embodiments thereof may be shown somewhat exaggeratedly in order to emphasize or highlight technical features of the present disclosure, but it should be understood that various modifications can be made by those skilled in the art in consideration of the above description and the drawings.

What is claimed is:

1. An auto-focusing apparatus having an asymmetric supporting structure, comprising:

a first frame having a magnet;

a second frame having an AF coil for moving the first frame in an optical axis direction;

a first ball group located between the first frame and the second frame and having a n (n is a natural number of 4 or above) number of balls arranged along the optical axis direction; and a second ball group located between the first frame and the second frame at a position different from the first ball group and having a m (m is a natural number of 4 or above) number of balls arranged along the optical axis direction, wherein the first ball group includes two first support balls having a greater size than the other balls in the first ball group, and the second ball group includes two second support balls having a greater size than the other balls in the second ball group;

wherein the first support balls are located at both ends of the first ball group, and wherein the second support balls are located at a center of the second ball group and adjacent to each other.

2. The auto-focusing apparatus having an asymmetric supporting structure according to claim 1, wherein the first support balls and the second support balls have the same size.

3. The auto-focusing apparatus having an asymmetric supporting structure according to claim 1, wherein the n and the m are 4, and wherein the first support balls are located at first and fourth positions in the first ball group based on the optical axis direction, and the second support balls are located at second and third positions in the second ball group based on the optical axis direction.

4. The auto-focusing apparatus having an asymmetric supporting structure according to claim 1, wherein the first frame has first and second guiding grooves extending along the optical axis direction, wherein the second frame has first and second accommodating grooves respectively facing the first and second guiding grooves, and wherein the first ball group is located between the first guiding groove and the first accommodating groove, and the second ball group is located between the second guiding groove and the second accommodating groove.

5. The auto-focusing apparatus having an asymmetric supporting structure according to claim 4, wherein at least one of the first guiding groove and the first accommodating groove has a V-shaped cross section.

*6. An auto-focusing apparatus having an asymmetric supporting structure, comprising:*

*a first frame having a magnet;*

*a second frame having an AF coil for moving the first frame in an optical axis direction;*

*a first ball group located between the first frame and the second frame and having a plurality of balls arranged along the optical axis direction; and*

*a second ball group located between the first frame and the second frame at a position different from the first ball group and having a plurality of balls arranged along the optical axis direction,*

*wherein the first ball group includes two first support balls making point contact with the first frame or the second frame, and the second ball group includes two second support balls making point contact with the first frame or the second frame; and*

*a pitch between the two second support balls is smaller than a pitch between the two first support balls,*

*wherein the two first support balls are located at both ends of the first ball group; and*

*the second support balls are located at a center of the second ball group and adjacent to each other.*

* * * * *